United States Patent [19]
Wakamatsu et al.

[11] Patent Number: 5,521,820
[45] Date of Patent: May 28, 1996

[54] METHOD FOR CONTROLLING A STEERING SYSTEM

[75] Inventors: Kiyoshi Wakamatsu; Yukihiro Fujiwara, both of Saitama-ken, Japan

[73] Assignee: Honda Giken Kogyo Kabushiki Kaisha, Tokyo, Japan

[21] Appl. No.: 147,825

[22] Filed: Nov. 4, 1993

[30] Foreign Application Priority Data

Nov. 5, 1992 [JP] Japan ................................. 4-322645

[51] Int. Cl.$^6$ .................................................. B62D 5/00
[52] U.S. Cl. .................... 364/424.05; 180/412; 180/445; 180/446
[58] Field of Search ...................... 364/424.05; 180/79.1, 180/140, 141, 142, 143; 280/91

[56] References Cited

U.S. PATENT DOCUMENTS

| | | | |
|---|---|---|---|
| 4,834,205 | 5/1989 | Mizuno et al. | 180/141 |
| 4,942,532 | 7/1990 | Mori | 364/424.05 |
| 4,984,646 | 1/1991 | Sano et al. | 180/79.1 |
| 5,029,660 | 7/1991 | Raad et al. | 364/424.05 |
| 5,322,308 | 6/1994 | Bishop | 280/91 |
| 5,365,440 | 11/1994 | Abe et al. | 364/424.05 |

OTHER PUBLICATIONS

Two–Degree–of–Freedom Design of Optimal Servosystems (Generalized Reference Signals); vol. 28, No. 3 343/350 (1992); Authors: Yasumasa Fujisaki and Masao Ikeda; Japanese Publication.

*Primary Examiner*—Gary Chin
*Attorney, Agent, or Firm*—Weiner, Carrier & Burt; Joseph P. Carrier; Irving M. Weiner

[57] ABSTRACT

An actuator for effecting a steering action is controlled by a feed-forward variable based on a target steering angle, a state feedback control variable based on an actual steering angle, and an integral control variable given as a sum of an integrated value of a deviation between the target steering angle and the actual steering angle, and an integrated value cancelling variable based on the target steering angle. The integral control variable is disregarded when the detected load is greater than the threshold value. Typically, the integrated value cancelling variable consists of a feedback state variable based on the actual steering angle. Thus, by disregarding the integral control variable in a low speed condition that involves a high load condition but does not require a high tracking capability, the need for the output capacity of the actuator can be substantially reduced without creating substantially any ill effect. This is particularly advantageous when applied to a rear wheel steering system of a front and rear wheel steering vehicle using an electric motor for its actuator.

8 Claims, 4 Drawing Sheets

METHOD FOR CONTROLLING A STEERING SYSTEM

TECHNICAL FIELD

The present invention relates to a method for controlling a powered steering system, in particular to a method suitable for controlling a rear wheel steering system of a front and rear wheel steering vehicle.

BACKGROUND OF THE INVENTION

As a servo system which is robust against external disturbances, there has been proposed a two-degree-of-freedom control system which can adjust its tracking property in dependence upon the presence of external disturbances (Transaction of SICE Vol. 28, No. 3, 343/350 (1992)).

According to such a conventional control system, a desired tracking property can be relatively easily obtained when the magnitude of the disturbances is not great enough to cause the control input to be saturated or reach its upper limit.

When such a control system is applied to a rear wheel steering system of a four wheel steering vehicle which steers the rear wheels with an actuator according to a steering command signal based on a predefined rear wheel steering model, since the external disturbances are affected by such factors as the vehicle speed, the friction of the steering mechanism, the road surface condition, and the tire properties in a highly complex manner, the actuator has to be provided with an extremely high output capacity for it to be capable of ensuring the ideal tracking property at all times. The need for such a high output capacity for the actuator is not economically acceptable in some cases, for instance when an electric motor is employed as the actuator.

The output capability of the actuator is naturally determined so that it may be sufficient in all the possible operating conditions. Thus, in a low speed range of the vehicle, for instance when the vehicle is stationary, the actuator is required to produce its maximum output. The steering load in a low speed range, for instance when the vehicle is stationary, may be as high as twice the normal load. In view of this fact, the inventors of this application have realized that the output capability of the actuator may be substantially reduced without any ill effect if the optimum tracking property is sought only in a high speed range where the steering load is relatively light, and that any favorable tracking capability or dynamic responsiveness is not important in a low speed range where the steering load is relatively heavy.

BRIEF SUMMARY OF THE INVENTION

In view of such problems of the prior art and the recognition by the inventors, a primary object of the present invention is to provide a method for controlling a steering system in a front and rear wheel steering vehicle which can minimize the range of the control input at a relatively low level by judiciously adjusting a control variable according to the operating condition of the vehicle.

A second object of the present invention is to provide a method for controlling a steering system which can minimize the need for the output capacity of the actuator without substantially degrading the performance of the steering system.

These and other objects of the present invention can be accomplished by providing a method for controlling a steering system, wherein an actuator for effecting a steering action is controlled by a feed-forward variable based on a target steering angle, a state feedback control variable based on an actual steering angle, and an integral control variable given as a sum of an integrated value of a deviation between the target steering angle and the actual steering angle, and an integrated value cancelling variable based on the target steering angle, comprising the steps of: detecting a load of the actuator; comparing a threshold value with a detected load of the actuator; and substantially disregarding the integral control variable when the detected load is greater than the threshold value. Typically, the integrated value cancelling variable consists of a feedback state variable based on the actual steering angle.

Thus, by disregarding or otherwise reducing the contribution of the integral control variable in an operating condition that involves a high load condition but does not require a high tracking capability, the need for the output capacity of the actuator can be substantially reduced without creating substantially any ill effect. This is particularly advantageous when applied to a rear wheel steering system of a front and rear wheel steering vehicle using an electric motor for its actuator because a rear wheel steering system must be highly compact because of the restrictions in mounting space.

Because the load of a steering system is highly dependent on the vehicle speed, and it is desirable to quickly reduce the output requirement for the actuator when the vehicle speed is reduced and restore the optimum tracking capability when the vehicle speed is increased, the threshold value should be lower in a low vehicle speed range than in a higher speed range.

To avoid any discontinuity or sudden change in the response of the steering system, it is preferred that the integral control variable is restored only gradually when the detected load drops from a level higher than the threshold value to a level below the threshold value.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
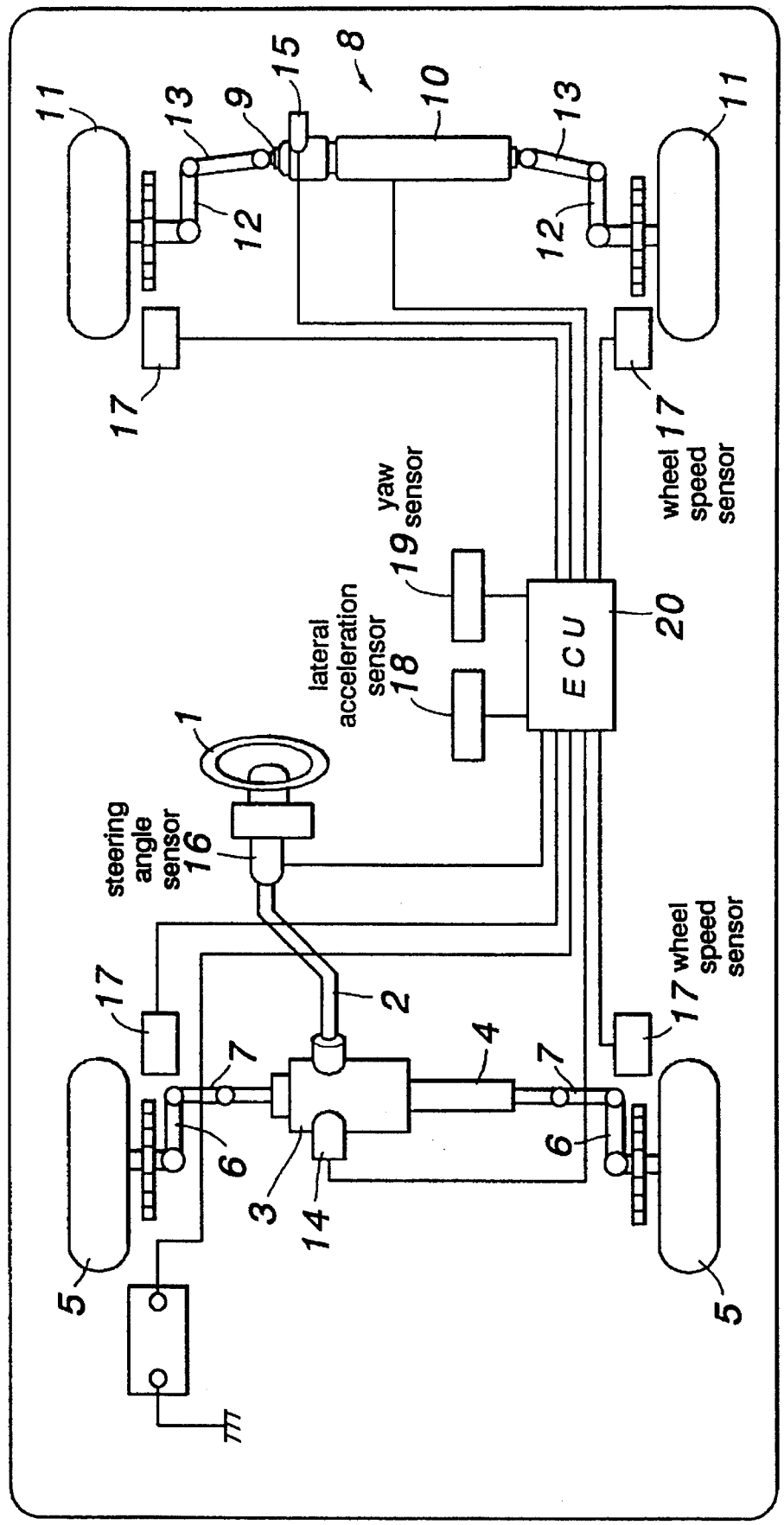
FIG. 1 is a schematic overall view of a four wheel steering vehicle to which the present invention is applied.

FIG. 1 generally illustrates the overall structure of a four wheel steering system for a vehicle to which the present invention is applied. A steering wheel 1 is securely attached to an end of a steering shaft 2, and the other end of the steering shaft 2 is mechanically connected to a steering rod 4 of a front wheel steering system 3. The two ends of the steering rod 4 are connected to knuckle arms 6 of associated front wheels 5 via tie rods 7, respectively.

A rear wheel steering system 8 disposed in a rear part of the vehicle body can move a laterally extending steering rod 9 by the drive force produced by an actuator, in this case, consisting of an electric motor 10. The two ends of the steering rod 9 are connected, in a way similar to the steering rod 4 for the front wheels 5, to knuckle arms 12 of associated rear wheels 11 via tie rods 13, respectively.

The steering systems 3 and 8 for the front and rear wheels are provided with steering angle sensors 14 and 15 for measuring the steering angles of the front and rear wheels 5 and 11, respectively, by detecting the displacement of the associated steering rods 4 and 9. The steering shaft 2 is provided with a steering angle sensor 16 for detecting the steering angle of the steering wheel 1. Each of the wheels 5 and 11 is provided with a vehicle speed sensor 17, and a lateral acceleration sensor 18 and a yaw rate sensor 19 are mounted on appropriate locations of the vehicle body. These sensors 14 through 19 are electrically connected to a control unit 20 incorporated with a computer for controlling the electric motor 10.

According to this control system, when the steering wheel 1 is turned by a vehicle operator, the steering rod 4 of the front wheel steering system 3 is mechanically actuated, optionally assisted by the output of a power steering system (not shown in the drawing) in a per se known manner, and the front wheels 5 are steered accordingly. At the same time, the steering angle of the steering wheel 1 and the displacement of the steering rod 4 are supplied to the computer unit 20 via the steering angle sensors 14 and 16. Based on the steering angle of the front wheels 5, the vehicle speed, the lateral acceleration, and the yaw rate thus detected, the control unit 20 determines the optimum steering angle of the rear wheels 11, and the electric motor 10 is actuated so as to steer the rear wheels 11 to this optimum steering angle.

The control flow of the control unit 20 is now described in the following with reference to FIGS. 2 and 3.

First of all, the actual steering angle $\theta r$ of the rear wheels 11 is read out from the steering angle sensor 15 (step 1), and the steering angular speed $d\theta r/dt$ is obtained by differentiating it with time (step 2). As a parameter characterizing the operating condition of the vehicle, the vehicle speed V is read out from the vehicle speed sensors 17 (step 3). Then, an overload threshold value is looked up from an overload threshold data map by using the vehicle speed as the address, and an overload threshold value for the current vehicle speed is obtained (step 4). Thereafter is found the deviation e of the current steering angle $\theta r$ of the rear wheels 11 from the target value $\theta rt$ which is determined according to a predefined rear wheel steering angle model.

The steering load of the rear wheels 11 is determined according to the electric current of the electric motor 10 for steering the rear wheels 11 (step 6), and is compared with the threshold value determined in step 4 (step 7). If the steering load is below the threshold value, the current condition is determined as a normal condition, and a cumulative deviation A is updated by the sum of the previous cumulative deviation A1 and the current deviation e (step 8).

Figure 2:
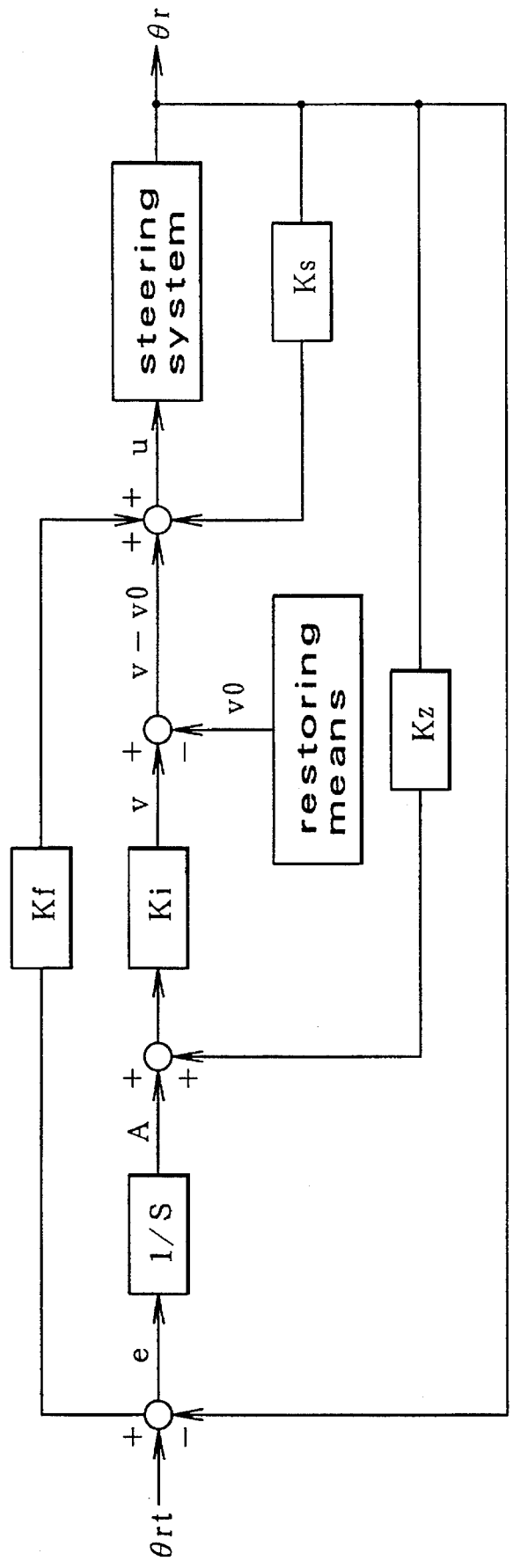
FIG. 2 is a block diagram of the control unit of the present invention.
Figure 3:
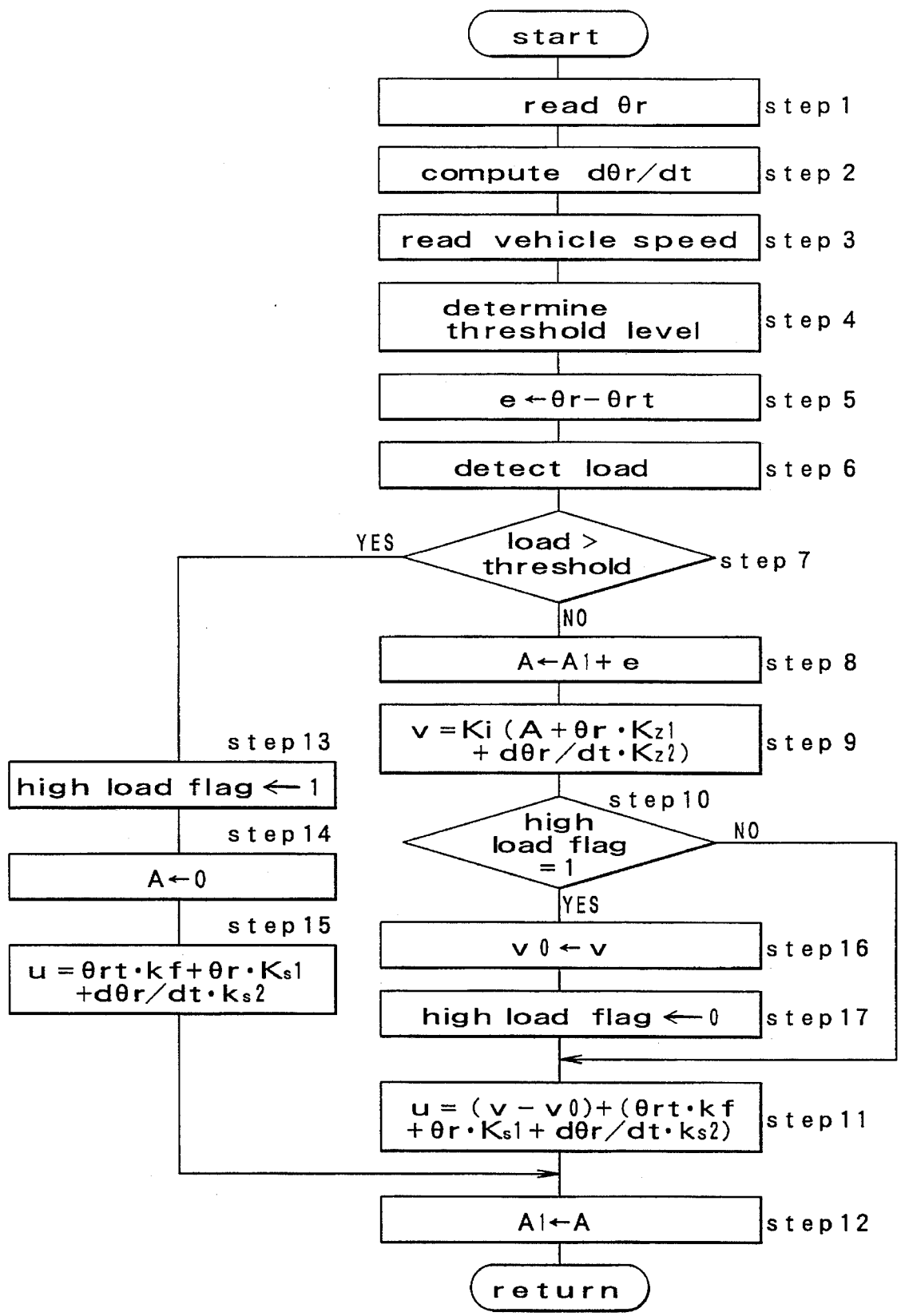
FIG. 3 is a flow chart showing a control flow according to the present invention.

Then, the integral term v or the integral control variable is obtained as given in the following:

v=integral gain Ki×(cumulative deviation A+current steering angle $\theta r$×feedback gain Kz1+steering angular speed $d\theta r/dt$×feedback gain Kz2) (step 9), where feedback gains Kz1 and Kz2 are for cancelling the effect of the integral element which in this case is given by a servo-compensator represented by the transfer function (1/s) in FIG. 2.

This integral term is intended for the purpose of appropriately setting the control variable according to the magnitude of the deviation, and improving the tracking property of the system.

The high load flag is checked (step 10). When the high load condition did not exist in the previous cycle, or the low load condition is still in continuation, the control command value u is given by the following:

u=(integral term v−initial integral term v0)+(target steering angle $\theta rt$×feed forward gain Kf+current steering angle $\theta r$×feedback gain Ks1+steering angular speed $d\theta r/dt$×feedback gain Ks2) (step 11).

If there are no external disturbances or modelling errors, the target value $\theta rt$ based on the rear wheel steering model agrees with the current steering angle $\theta r$, and the cumulative deviation is extremely small. Therefore, the integral term v is also small, and the required tracking capability and stability of the system can be ensured only by setting the feed-forward gain Kf and the feedback gain Ks at appropriate levels.

This command value u is supplied to the electric motor 10, and the cumulative deviation is set at A1 (step 12).

On the other hand, when it is determined that the high load condition exists in step 7, the high load flag is set (step 13), and the cumulative deviation A is cleared (step 14). In addition, the output for the integral control variable is cancelled.

The command value u in this case is therefore given by:

u=target steering angle $\theta rt$×feed forward gain Kf+current steering angle $\theta r$×feedback gain Ks1+steering angular speed $d\theta r/dt$×feedback gain Ks2 (step 15).

Thus, the control input is restricted when the overload condition is detected.

Because an excessive steering reaction is produced only when the vehicle speed is low, for instance when the vehicle is completely stationary, a static responsiveness is required, but a dynamic responsiveness is not important. In other words, a quick tracking capability is not required. Therefore, according to the present invention, when the load from the road surface acting upon the rear wheels is greater than a prescribed level, the command value given to the actuator disregards the integral control variables including the integrated value of the deviation e between the target steering angle $\theta rt$ and the current steering angle $\theta r$. This results in the reduction in the necessary output capability of the electric motor.

Figure 4:
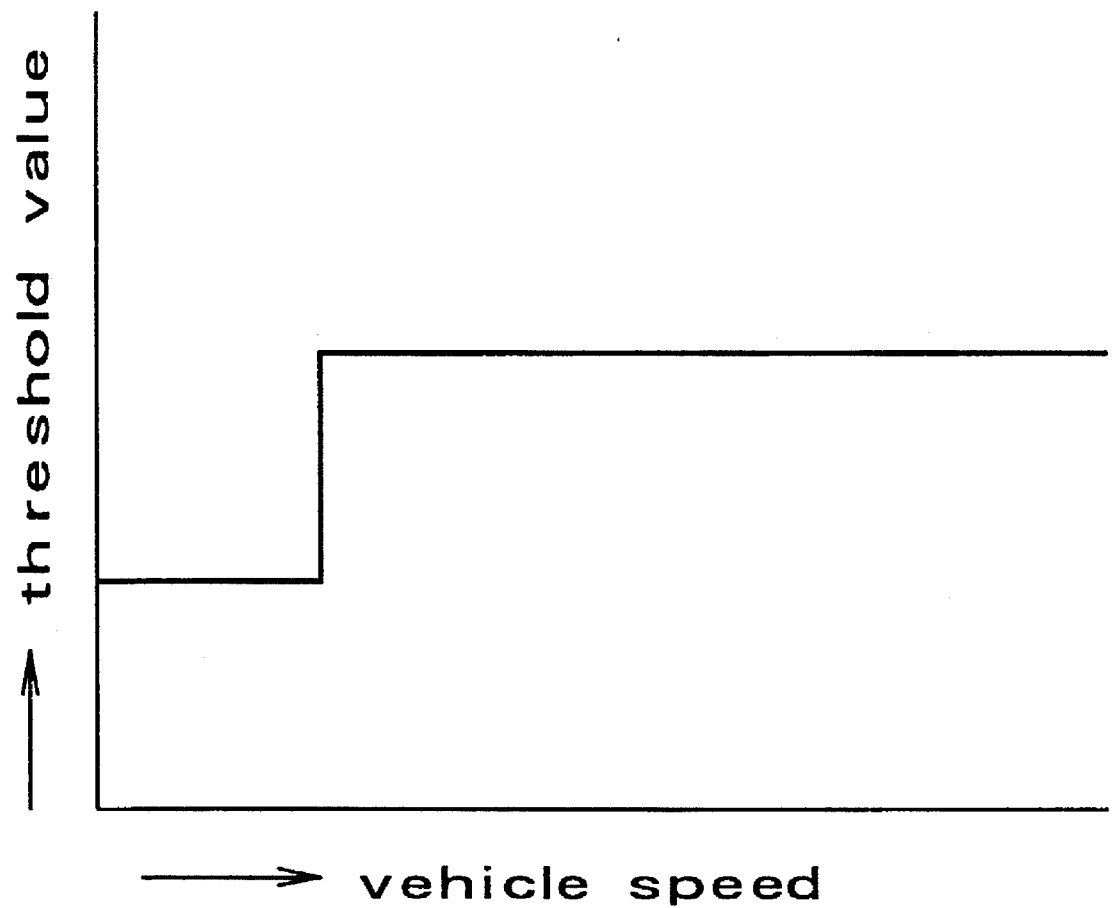
FIG. 4 is a conceptual graph showing the relationship between the threshold value and the vehicle speed.

In particular, by changing the threshold level for determining such an overload condition depending on the vehicle speed, (refer to FIG. 4), a quick response is obtained in a high speed range while a saving in the output capacity of the electric motor is accomplished in a low speed range by eliminating the integral term from the command value u.

On the other hand, when the high load flag indicates, in step 10, that a high load condition existed in the previous cycle (as it means that the high load condition has stopped, and the low load condition has started), the integral term v obtained in step 9 is set as the initial value v0 (step 16), and the high load flag is reset (step 17).

When the control mode is thus changed from the high load condition in which the integral term is disregarded to the low load condition, the integral control variable upon the onset of the low load condition is retained as the initial value v0 for the integral term, and this value is subsequently subtracted from the integral term v so that the abrupt change in the tracking property of the control system may be avoided.

Thus, according to the present invention, both the tracking property and the stability can be optimized in the steering system consisting of a servo control system depending on the presence of external disturbances, and the control variable is intentionally restricted in the presence of an overload condition so that the need for a high output capacity of the actuator may be avoided by somewhat reducing the responsiveness of the tracking property. Since the overload condition occurs only when the vehicle speed is extremely low, in particular when the vehicle is stationary, any such compromise in the dynamic responsiveness of the steering system would not create any drawbacks. Thus, the present invention allows compact and economical design of the control system without substantially compromising the performance of the control system.

Although the present invention has been described in terms of a specific embodiment thereof, it is possible to modify and alter details thereof without departing from the spirit of the present invention.

What we claim is:

1. A method for controlling a steering system, wherein an actuator for effecting a steering action is controlled by a feed-forward variable based on a target steering angle, a state feedback control variable based on an actual steering angle, and an integral control variable given as a sum of an integrated value of a deviation between said target steering angle and said actual steering angle, and an integrated value cancelling variable based on said target steering angle, comprising the steps of:

detecting a load of said actuator;

comparing a threshold value with a detected load of said actuator; and disregarding said integral control variable when said detected load is greater than said threshold value.

2. A method according to claim 1, wherein said integrated value cancelling variable consists of another state feedback variable based on said actual steering angle.

3. A method according to claim 1, wherein said steering system is a rear wheel steering system of a front and rear wheel steering vehicle.

4. A method according to claim 1, wherein said actuator consists of an electric motor.

5. A method according to claim 1, wherein said threshold value is variable such that it is lower in a low vehicle speed range than in a higher speed range.

6. A method according to claim 1, including a further step of restoring said integral control variable when said detected load drops from a level higher than said threshold value to a level below said threshold value, said restoring step being effected only gradually.

7. A method for controlling a steering system, wherein an actuator for effecting a steering action is controlled by a feed-forward variable based on a target steering angle, a state feedback control variable based on an actual steering angle, and an integral control variable given as a sum of an integrated value of a deviation between said target steering angle and said actual steering angle, and an integrated value cancelling variable based on said target steering angle, comprising the steps of:

detecting a load of said actuator;

comparing a threshold value with a detected load of said actuator; and highly limiting a control effect of said integral control variable when said detected load is greater than the threshold value.

8. A method according to claim 7, wherein said control effect of the integral control variable is cancelled when a detected load is greater than the threshold value.

* * * * *